United States Patent
Apfel

(10) Patent No.: US 7,113,590 B2
(45) Date of Patent: Sep. 26, 2006

(54) METHOD AND APPARATUS FOR A DIFFERENTIAL FEEDBACK IN AN ACTIVE IMPEDENCE FEEDBACK CIRCUIT

(75) Inventor: Russell J. Apfel, Austin, TX (US)

(73) Assignee: Legerity, Inc., Austin, TX (US)

( * ) Notice: Subject to any disclaimer, the term of this patent is extended or adjusted under 35 U.S.C. 154(b) by 217 days.

(21) Appl. No.: 10/384,299

(22) Filed: Mar. 7, 2003

(65) Prior Publication Data

US 2004/0174982 A1 Sep. 9, 2004

(51) Int. Cl.
*H04M 1/00* (2006.01)
(52) U.S. Cl. .................... 379/399.01; 379/390.04; 379/402; 379/398
(58) Field of Classification Search ........... 379/390.04, 379/398, 399.01, 402
See application file for complete search history.

(56) References Cited

U.S. PATENT DOCUMENTS

| | | | | |
|---|---|---|---|---|
| 4,387,273 A | * | 6/1983 | Chea, Jr. | 379/398 |
| 2004/0174990 A1 | * | 9/2004 | Apfel | 379/398 |

* cited by examiner

*Primary Examiner*—Jefferey F. Harold
(74) *Attorney, Agent, or Firm*—Williams, Morgan & Ameson, P.C.

(57) ABSTRACT

A method and apparatus is provided for performing an active impedance differential current feedback. A signal is received. A current feedback of an output signal in an active feedback synthesis mode is performed based upon the signal. The active current feedback includes using an active feedback network for conditioning an output signal, converting the signal into a differential current signal, and summing at least two components of the differential current signal for performing a differential feedback.

28 Claims, 8 Drawing Sheets

METHOD AND APPARATUS FOR A DIFFERENTIAL FEEDBACK IN AN ACTIVE IMPEDENCE FEEDBACK CIRCUIT

BACKGROUND OF THE INVENTION

1. Field of the Invention

This invention relates generally to telecommunications, and, more particularly, to providing a differential current feedback in an active impedance feedback circuit for signal reception and/or transmission.

2. Description of the Related Art

In communications systems, particularly telephony such as a Plain Old Telephone System (POTS), it is common practice to transmit signals between a subscriber station and a central switching office via a two-wire, bi-directional communication channel. A line card generally connects the subscriber station to the central switching office. The functions of the line card include supplying talk battery, performing wake-up sequences of circuits to allow communications to take place, and the like. Voltage signals are processed and conditioned when being driven onto telecommunication lines.

POTS was designed primarily for voice communication, and thus provides an inadequate data transmission rate for many modern applications. To meet the demand for high-speed communication, designers have sought innovative and cost-effective solutions that would take advantage of the existing network infrastructure. Several technological solutions proposed in the telecommunications industry use the existing network of telephone wires. A promising one of these technologies is the Digital Subscriber Line (xDSL or DSL) technology.

xDSL is making the existing network of telephone lines more robust and versatile. Once considered virtually unusable for broadband communications, an ordinary twisted pair equipped with DSL interfaces can transmit video, television, and very high-speed data. The fact that more than six hundred million telephone lines exist around the world is a compelling reason for these lines to be used as the primary transmission conduits for at least several more decades. Because DSL utilizes telephone wiring already installed in virtually every home and business in the world, it has been embraced by many as one of the more promising and viable options.

There are now at least three popular versions of DSL technology, namely Asymmetrical Digital Subscriber Line (ADSL), Very High-Speed Digital Subscriber Line (VDSL), and Symmetric Digital Subscriber Line (SDSL). Although each technology is generally directed at different types of users, they all share certain characteristics. For example, all four DSL systems utilize the existing, ubiquitous telephone wiring infrastructure, deliver greater bandwidth, and operate by employing special digital signal processing. Because the aforementioned technologies are well known in the art, they will not be described in detail herein.

DSL and POTS technologies can co-exist in one line (e.g., also referred to as a "subscriber line"). Traditional analog voice band interfaces use the same frequency band, 0–4 Kilohertz (KHz), as telephone service, thereby preventing concurrent voice and data use. A DSL interface, on the other hand, operates at frequencies above the voice channels, from 25 KHz to 1.1 Megahertz (MHz). Thus, a single DSL line is capable of offering simultaneous channels for voice and data. It should be noted that the standards for certain derivatives of ADSL are still in definition as of this writing, and therefore are subject to change. DSL systems use digital signal processing (DSP) to increase throughput and signal quality through common copper telephone wire. It provides a downstream data transfer rate from the DSL Point-of-Presence (POP) to the subscriber location at speeds of up to 1.5 megabits per second (MBPS). The transfer rate of 1.5 MBPS, for instance, is fifty times faster than a conventional 28.8 kilobits per second (KBPS) transfer rate typically found in conventional POTS systems.

DSL systems generally employ a signal detection system that monitors the telephone line for communication requests. More specifically, the line card in the central office polls the telephone line to detect any communication requests from a DSL data transceiver, such as a DSL modem, located at a subscriber station. There are multiple types of signals that are received and transmitted over multiple signal paths during telecommunication operation. Many times, feedback configurations in the amplifiers that process the transmission signals cause noise and power problems.

Many of today's amplifier circuits may call for electronic components that have high bandwidth, which may increase consumption of power. Many times, power consumption in the line card can become undesirably high. Amplifier circuits that are used to condition communication signals often consume large amounts of power. Excessive power use can compromise the effectiveness of line cards, particularly for remote line cards, which rely upon portable power supplies. Excessive power consumption can also require additional resources to counteract the effects of high power consumption, such as additional cooling systems to keep line card circuitry in operating condition. Excessive power consumption can also require additional circuits to furnish the required amounts of power needed for efficient operation of line cards. Excessive power consumption can cause appreciable inefficiencies in the operation of line cards and the communication system as a whole.

The prior art implementations of signal conditioning circuits generally implement signal feedback configurations that generally take the output voltage signal and then feed the voltage signal back to a negative input of an amplifier within a circuit. In other words, the direct output voltage signal is the feedback signal used in the implementations described above. Among the problems associated with the current implementations, include the fact that a larger signal is fed back into the circuit described above. The problem with such an implementation is that larger signals may generally carry larger amounts of noise. Therefore, feeding back larger signals amounts to feeding back larger amounts of noise into the circuit, this may cause performance problems in the amplifier circuit.

Additionally, feeding back the output voltage signal may require amplifiers that have relatively large bandwidth capabilities. Utilizing amplifiers with larger bandwidth capabilities generally increases power consumption. Additionally, many prior art systems employ feedback configurations that use single-ended feedback signals. The circuits that use these types of configurations may experience an excessive amount of longitudinal signals, such as longitudinal currents. Longitudinal signals may enter one of more amplification stages within a circuit and cause excessive noise. Utilizing the current methodologies, the performance of a signal conditioning circuit may be compromised.

The present invention is directed to overcoming, or at least reducing the effects of, one or more of the problems set forth above.

SUMMARY OF THE INVENTION

In one aspect of the present invention, a method is provided for performing an active impedance differential current feedback. A signal is received. A current feedback of an output signal in an active feedback synthesis mode is performed based upon the signal. The active current feedback includes using an active feedback network for conditioning an output signal, converting the signal into a differential current signal, and summing at least two components of the differential current signal for performing a differential feedback.

In another aspect of the present invention, an apparatus is provided for performing an active impedance differential current feedback. The apparatus of the present invention includes a first amplifier and a second amplifier to buffer a differential input signal to generate a differential output signal. The apparatus also includes an active impedance network that is adapted to condition the differential output signal and sum at a first component and a second component of a first portion of the conditioned differential output signal. The active impedance network is also adapted to and to sum first and second components of a second portion of the conditioned differential output signal for generating a differential feedback signal for feedback into the first and second amplifiers.

In another aspect of the present invention, an apparatus is provided for performing an active impedance differential current feedback. The apparatus of the present invention includes a voltage-to-current signal converter to convert a differential input voltage signal and a first buffer amplifier operatively coupled to the voltage to current signal converter. The first buffer amplifier is adapted to receive a component of a converted differential input signal on a first input terminal and produce a first buffered current signal. The apparatus also includes a first sense resistor operatively coupled with the buffered amplifier and a second buffer amplifier operatively coupled to the voltage-to-current signal converter. The second buffer amplifier is adapted to receive a component of the converted differential input signal on a second input terminal and produce a second buffered current signal. The apparatus also includes a second sense resistor operatively coupled with the second buffer amplifier; an active feedback impedance network operatively coupled with the first and second sense resistors; and a first datasense amplifier operatively coupled to the active feedback impedance network and to the first sense resistor. The first datasense amplifier is adapted to generate a first and second component of a differential feedback signal. The apparatus also includes a second datasense amplifier operatively coupled to the active feedback impedance network and to the second sense resistor. The second datasense amplifier is adapted to generate a third and fourth component of the differential feedback signal. The apparatus also includes a first summing node for summing the first and second components of the differential feedback signal to generate a first component of a summed differential feedback signal for feedback into the first buffer amplifier and a second summing node for summing the third and fourth components of the differential feedback signal to generate a second component of the summed differential feedback signal for feedback into the second buffer amplifier.

In another aspect of the present invention, a system is provided for performing an active impedance differential current feedback. The system of the present invention comprises a subscriber line. The system also includes a line card electronically coupled with the subscriber line. The line card is adapted to receiving a signal. The line card is also capable of performing a current feedback of an output signal in an active feedback synthesis mode based upon the signal. Performing the active current feedback includes using an active feedback network for conditioning an output signal, converting the signal into a differential current signal, and summing at least two components of the differential current signal for performing a differential feedback.

BRIEF DESCRIPTION OF THE DRAWINGS

The invention may be understood by reference to the following description taken in conjunction with the accompanying drawings, in which like reference numerals identify like elements, and in which:

FIG. 9 illustrates a flowchart depiction of a method in accordance with one illustrative embodiment of the present invention.

Figure 1:
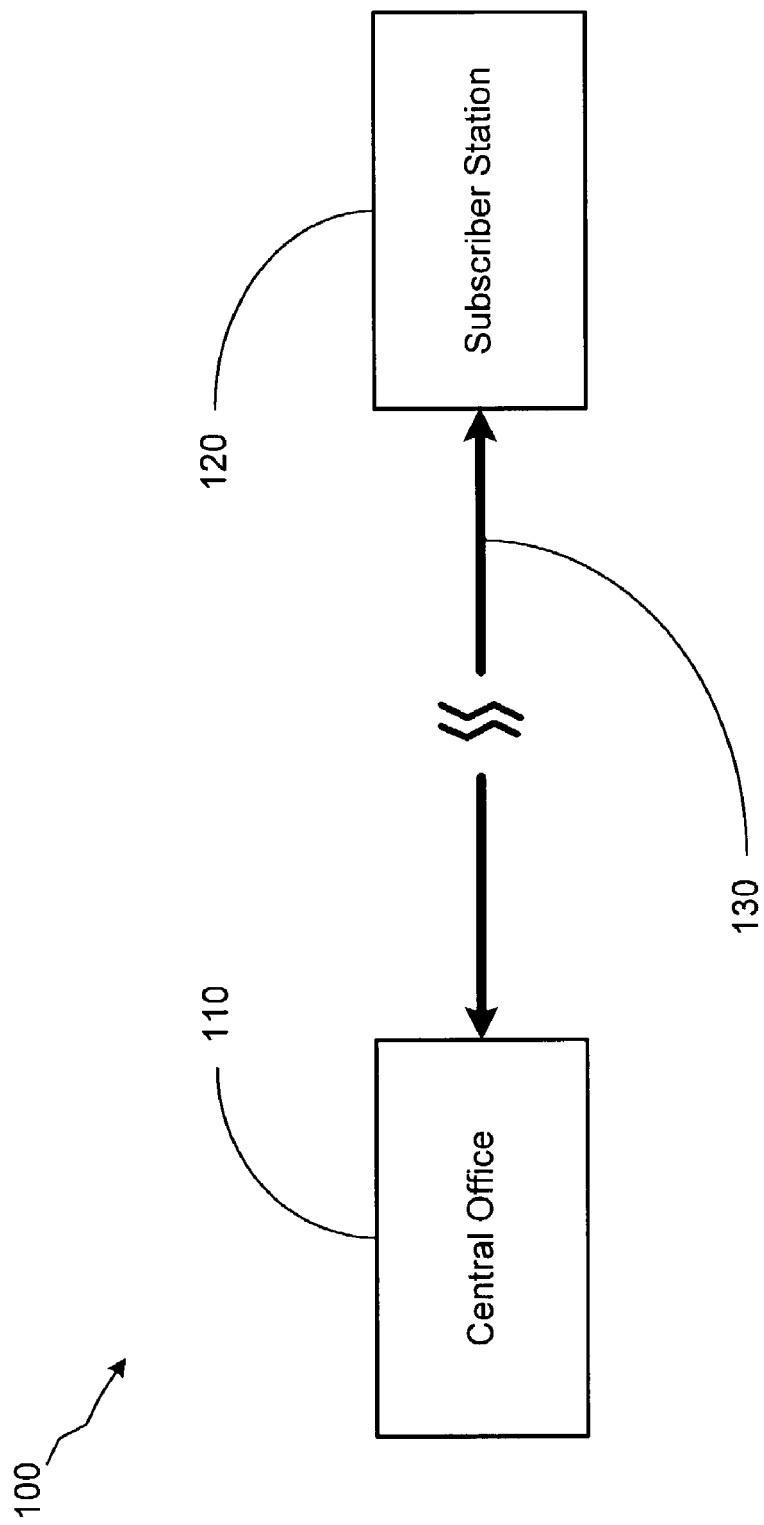
FIG. 1 illustrates a first embodiment of an apparatus in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for a method and apparatus for utilizing a current feedback configuration to reduce noise and/or power consumption in an amplifier circuit used to condition electrical signals (e.g., a communications signal). Embodiments of the present invention provide for feeding back a smaller current signal relative to an output signal in a signal amplification/buffer circuitry. Embodiments of the present invention call for canceling the feedback current signal and using the cancelled signal as a feedback in an active impedance loop. The active impedance loop is capable of reacting to an output impedance seen by an amplifier circuit and reacting to the impedance to cancel a substantial portion of the feedback signal using an active impedance feedback circuitry to feedback a smaller signal. Therefore, a lower amount of noise may be experienced by a signal conditioning circuit and improvements in power consumption may be realized. Utilizing a differential feedback configuration, longitudinal balance in a signal conditioning circuit may be achieved.

An impedance circuitry that comprises an impedance unit that is proportional to an output impedance seen by a signal conditioning circuit, along with one or more sense resistors that are proportional to the output impedance, may be used to perform an active impedance feedback. For example, embodiments of the present invention call for determining a turns ratio N of an output impedance (e.g. a transformer) and implementing an active impedance feedback implementation that is proportional to N. An output voltage signal is converted into a current signal in a feedback loop. Utilizing the active impedance circuit, a feedback current signal is summed such that the feedback current signal is cancelled as it is being fed back into an input buffer or amplifier. Therefore, better noise-to-signal ratio may be achieved. Also, the dynamic range of the signal conditioning circuit may be improved. Embodiments of the present invention also call for converting the output signal into a current signal and summing the current signals such that a small signal (i.e., a cancelled current signal) is sent back into the input buffer/amplifier as a feedback signal. Lower bandwidth amplifiers may be implemented due to the operation in the current domain. Therefore, the amplifier experiences a lower gain, thereby reducing power consumption. The current feedback configuration may be used to broadband the amplifiers in a signal conditioning circuit. Further, using the current feedback in a differential feedback configuration may provide the added benefit of promoting longitudinal balance. Although embodiments of the present invention are described in the context of a line card implementation, the teachings provided by the invention may be implemented into a variety of signal conditioning circuits in a variety of electronic/electrical applications.

Referring now to the drawings and in particular to FIG. 1, an apparatus 100 in accordance with the present invention is illustrated. The apparatus 100 includes a central office 110 that is coupled to a subscriber station 120 via a subscriber line 130. The central office 110 and the subscriber station 120 are capable of sending and receiving a signal comprising a voice and data band. The voice band, as used herein, refers to a POTS voice signal ranging from 0–4 KHz. The data band refers to frequencies above the voice band, and may include, for example, the frequency range employed in xDSL technologies. In one embodiment, the subscriber line 130 may be a Public Switched Telephone Network (PSTN) line, a Private Branch Exchange (PBX) line, or any other medium capable of transmitting signals.

The subscriber station 120 may be a telephonic device capable of supporting pulse dialing. The term "telephonic device," as utilized herein, includes a telephone, or any other device capable of providing a communication link between at least two users. In one embodiment, the subscriber station 120 may be one of a variety of available conventional telephones, such as wired telephones and similar devices. In an alternative embodiment, the subscriber station 120 may be any "device" capable of performing a substantially equivalent function of a conventional telephone, which may include, but is not limited to, transmitting and/or receiving voice and data signals. Examples of the subscriber station 120 include a data processing system (DPS) utilizing a modem to perform telephony, a television phone, a wireless local loop, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
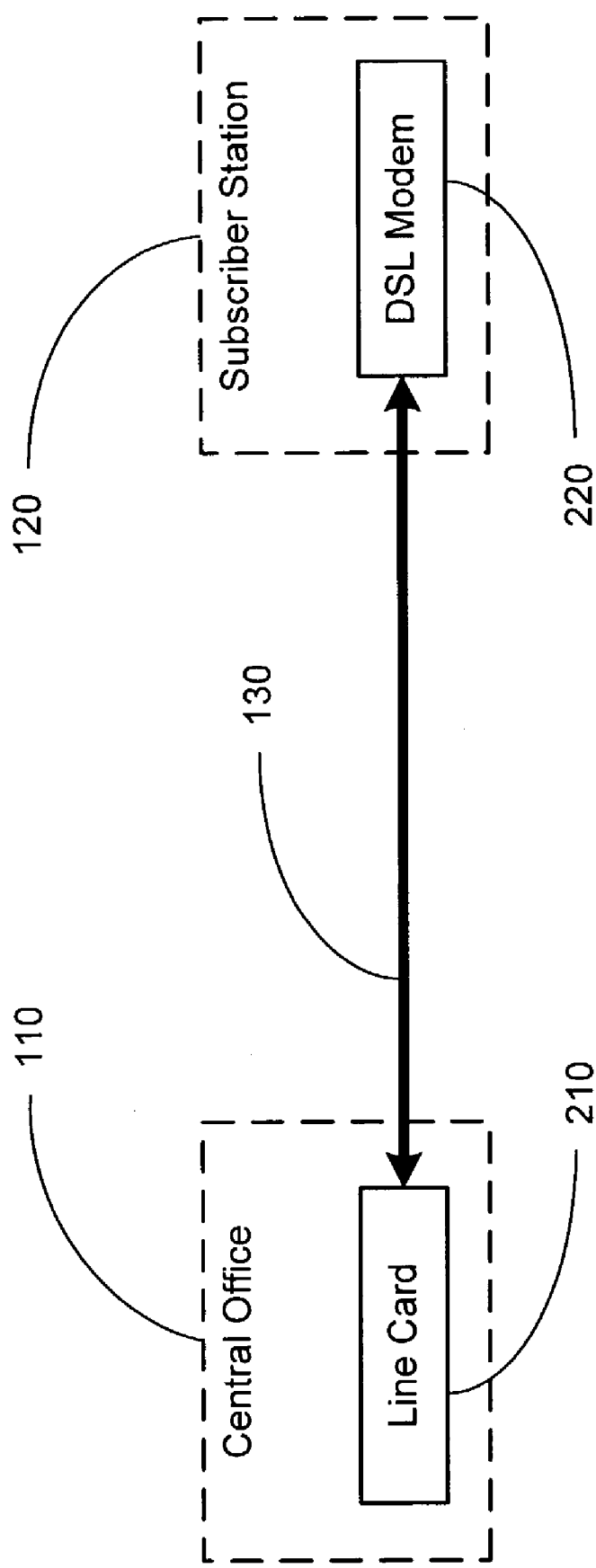
FIG. 2 illustrates an implementation of a line card into the apparatus described in FIG. 1 in accordance with one illustrative embodiment of the present invention.

Turning now to FIG. 2, a line card 210 and a DSL modem 220 are illustrated in accordance with the present invention. In one embodiment, the line card 210, which is integrated into the central office 110, is coupled with the DSL modem 220, which resides within the subscriber station 120. Because voice and/or data can be transmitted on the subscriber line 130, the signal received and transmitted by the line card 210 and the DSL modem 220 may include voice and data band frequencies.

The line card 210 may be located at a central office 110 or a remote location somewhere between the central office 110 and the subscriber station 120 (see FIG. 1). The line card 210 services the subscriber station 120, which in the illustrated embodiment is a telephonic device. The line card 210 is capable of processing DC voltage signals and AC signals. The subscriber line 130 in the instant embodiment is a telephone line. The combination of the telephone device (subscriber station 120) and the telephone line (subscriber line 130) is generally referred to as a subscriber loop.

The line card 210, which may be capable of supporting a plurality of subscriber lines 130, performs, among other things, two fundamental functions: DC loop supervision and DC feed. The purpose of DC feed is to supply enough power to operate the subscriber station 120 at the customer end. The purpose of DC loop supervision is to detect changes in DC load, such as on-hook events, off-hook events, rotary dialing, or any other event that cause the DC load to change. In the interest of clarity and to avoid obscuring the invention, only that portion of the line card 210 that is helpful to an understanding of the invention is illustrated.

Figure 3:
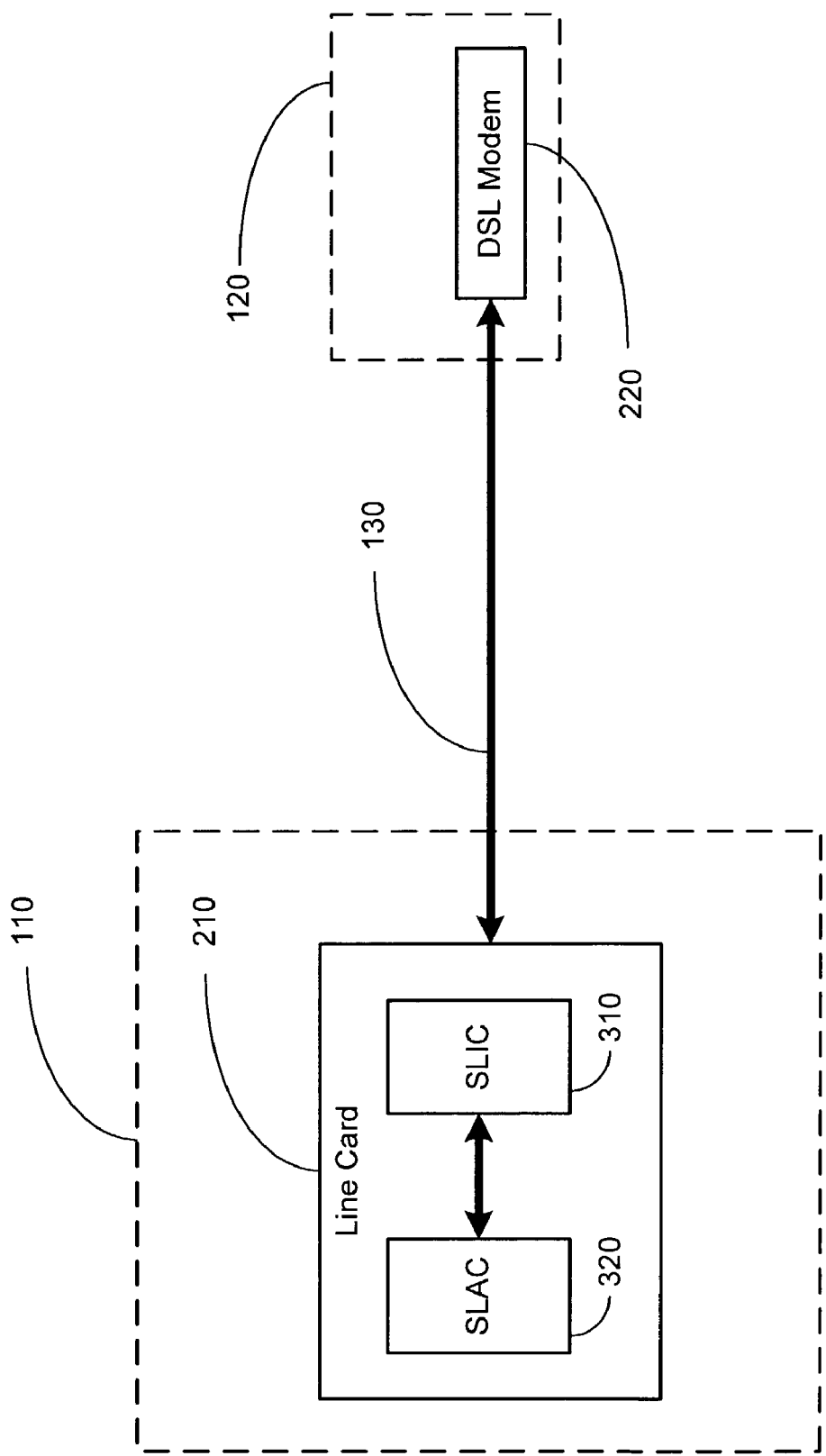
FIG. 3 illustrates a more detailed depiction of the line card in accordance with one illustrative embodiment of the present invention.

Turning now to FIG. 3, one embodiment of the line card 210 is illustrated. In one embodiment, the line card 210 comprises a subscriber line interface circuit (SLIC) 310 as well as a subscriber line audio-processing circuit (SLAC) 320. The SLIC 310 performs a variety of interface functions between the line card 210 and the subscriber line 130. The SLIC 310 is also capable of performing a variety of functions, such as battery feed, overload protection, polarity reversal, on-hook transmission, and current limiting. The SLIC 310 is connected to the SLAC 320. The SLAC 320 is capable of processing analog-to-digital (A/D) and digital-to-analog (D/A) signal conversion, filtering, feed control, and supervision.

Figure 4:
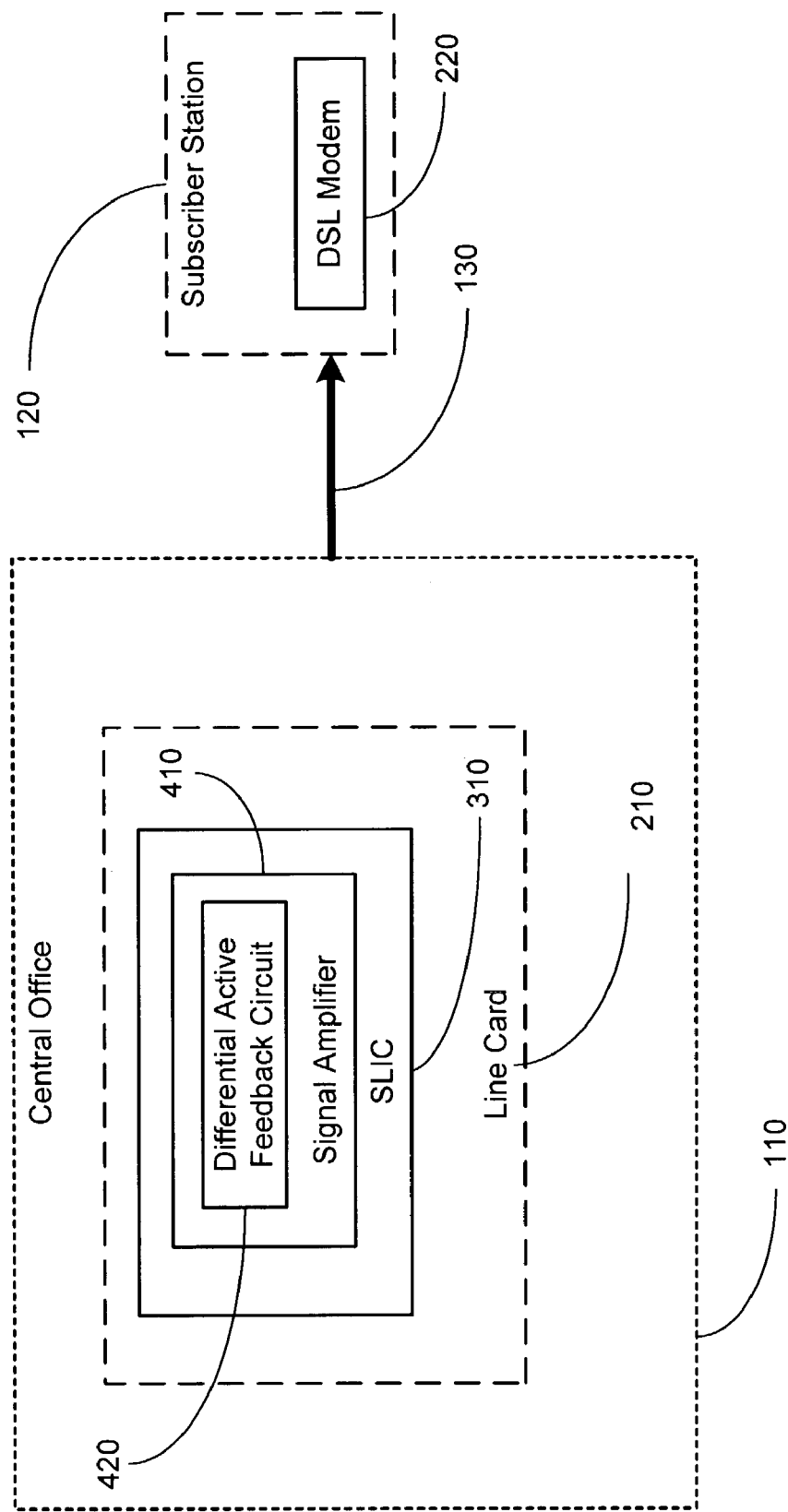
FIG. 4 illustrates a simplified block diagram depiction of the SLIC described in FIG. 3, in accordance with one illustrative embodiment of the present invention.

Turning now to FIG. 4, a more detailed description of the line card 210 in accordance with one embodiment of the present invention is illustrated. In one embodiment, the SLIC 310 comprises a signal amplifier 410. The signal amplifier 410 is capable of amplifying an output signal sent by the line card 210. The signal amplifier 410 provides for processing and amplifying the communication signal in such a way that reduced power and lower noise levels are achieved. The signal amplifier 410 also receives communication signals, buffers them, and provides an output buffering stage for driving the received communication signals. The signal amplifier 410 comprises a differential active feedback circuit 420 that is capable of providing an active impedance feedback described above in a differential feedback configuration. A more detailed description of the circuitry relating to the differential active feedback circuit 420 is provided in the drawings and related description below.

Figure 5:
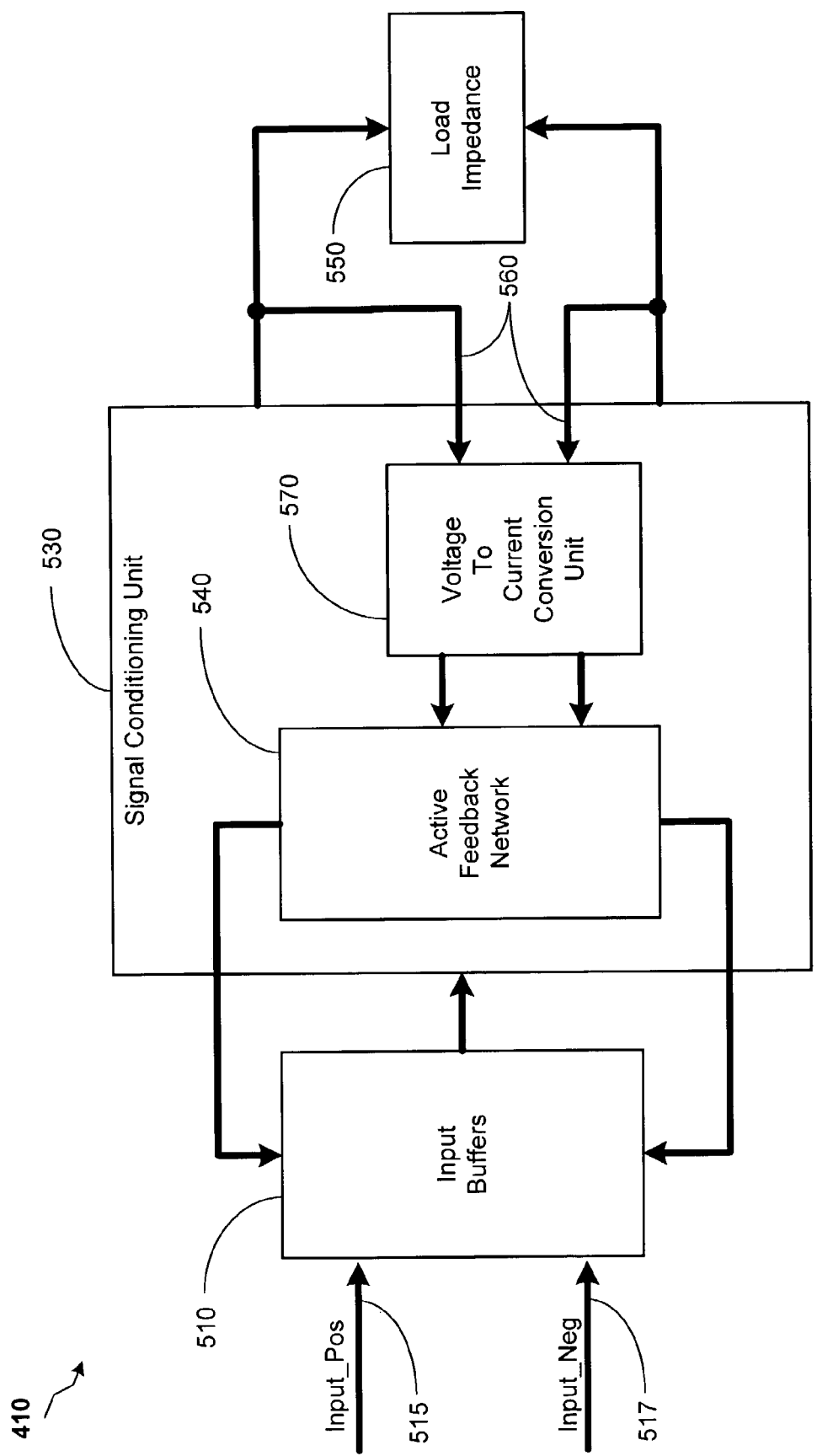
FIG. 5 illustrates a block diagram depiction of a signal conditioning unit in the SLIC of FIG. 4, in accordance with one illustrative embodiment of the present invention.

Turning now to FIG. 5, a block diagram representation of one embodiment of the signal amplifier 410 is illustrated. The signal amplifier 410 comprises a set of input buffers 510. The input buffers 510 receive a differential input signal that comprises an input positive portion of a line 515 (input_pos) and an input negative portion on a line 517 (input_neg). The input buffers 510 buffer the differential input signals and process them using a signal conditioning unit 530, which provides a differential output signal to a load impedance 550. The load impedance 550 may comprise an equivalent impedance of a transmission line, which may be experienced through a transformer, affecting the output impedance seen by the signal conditioning unit 530.

The signal conditioning unit 530 receives a differential feedback signal pair 560, which is fed-back differentially from the signal that is sent to the load. The differential feedback signal pair 560 is generally current signals. The signal conditioning unit 530 comprises a voltage-to-current conversion unit 570, which converts the differential voltage pair 560 into a differential current signal. In one embodiment, the signal condition unit 530 sums components of the differential current signal for performing cancellation, thereby promoting longitudinal balance. The signal conditioning unit 530 may also comprise an active feedback network 540. The active feedback network 540 is capable of extracting the differential voltage signal from the conversion unit 570 and providing a differential active feedback synthesis such that a small differential signal pair 570 is fed-back into an amplifier, which may be housed within the input buffers 510. A more detailed description of the various circuits relating to the components shown in FIG. 5 is provided in greater detail below.

Figure 6:
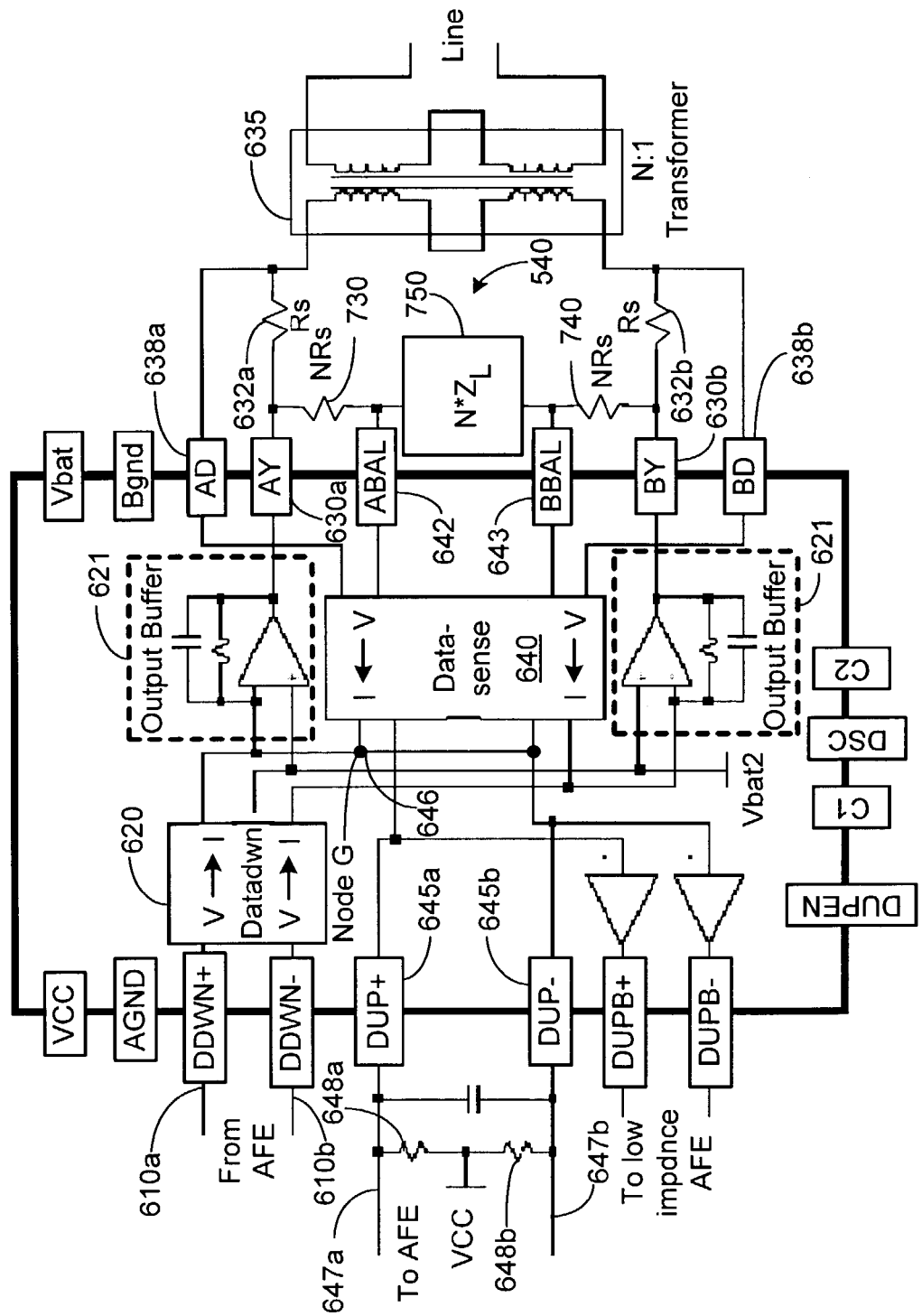
FIG. 6 illustrates a more detailed block diagram depiction of the SLIC of FIG. 4, in accordance with one illustrative embodiment of the present invention.

Turning now to FIG. 6, a block diagram representation of the implementation of the signal amplifier 410 described in the present invention is illustrated. The block diagram illustrated in FIG. 6 generally illustrates the processing of communication signals received and transmitted by the line card 210 using the signal amplifier 410 in the SLIC 310. In one embodiment, the block diagram of FIG. 6 may be implemented in a semiconductor device (e.g., a semiconductor chip).

The downstream (DS) signal voltage (downstream relative to the line card 210) is presented at the DDWN+/−pins (on a line 610a and a line 610b), where it is converted into a differential current by a datadown block 620, which drives a set of output buffers 621. In one embodiment, the output buffers 621 have inverting inputs. Generally, the output buffers 621 are configured as transconductance amplifiers, therefore, the DS signal is re-converted into a differential voltage at output pins AY 630a and BY 630b. In one embodiment, the gain applied to the DS signal may provide a signal that may be approximately 48 volts peak to peak from DDWN+/−610a, 610b to AY 630a and BY 630b. The output voltage at AY, BY 630a, 630b drives a step-down transformer 635, which has a turns ratio of N:1, through a pair of current sensing resistors, Rs 632a, 632b.

A datasense block 640 implements the communications signal path. Two transconductance stages within the datasense block 640 convert the voltage signal across AD, ABAL 638a, 642 and BD, BBAL 638b, 643 into a differential current signal pair, DUP+645a and DUP−645b. External load resistors 648a, 648b convert the signal back to a signal voltage. As the voltage signal across AD, ABAL 638a, 642 and BD, BBAL 638b, 643 becomes proportional to the loop current (including the turns ratio, N), the transfer function from loop current to the differential current signal pair DUP+645a and DUP−645b becomes a current gain. The current gain may be fixed for a given set of external components.

The circuit comprises a pair of sense resistors (NRs 650a and NRs 650b) that are proportional to the turns ratio N, and an active impedance $NZ_L$ 750 to provide an approximate cancellation of the DS signal across AD, ABAL 638a, 642 and BD, BBAL 638b, 643. The cancellation of the DS signal allows the datasense block 640 to operate without having to process the full DS signal. This significantly reduces the dynamic range requirements of the datasense block 640, which in one embodiment, may be designed to cope with a substantially worst-case cancellation of 12 dB.

Additional current outputs from the datasense block 640 may drive feedback signal currents into summing nodes of the output buffers 621 blocks. This forms a feedback loop, which sets the terminating impedance across AD 638a to BD 638b. In one embodiment, provided that Rs 632a, 632b is substantially made equal to $N^2*6.2$ ohms, the impedance at AD 638a, BD 638b may be $N^2*100$ ohms. Since the feedback loop described above generally does not respond to DS signals, it does not control the terminating impedance for DS signals. Generally, the impedance may be low in this case. However, less than ideal echo cancellation may result in some variability of the DS voltage gain.

The circuitry shown in FIG. 6 comprises an active feedback network 540. The active feedback network 540 is capable of providing an active adjustment to the impedance provided by the transformer 635 such that a cancelled signal is fed back via the A balance and the B balance terminals 642, 643. The node 646 (node G) is created by summing the outputs from the datasense 640. The summing of the signals on node G 646, which is fed back to the output buffers 621 provides a cancelled signal feedback, which is a signal that is smaller than what it would be without cancellation. The components of the active feedback network 540 is based upon the turn ratio N of the transformer 635. In other words, the value of the components of the active feedback network 540 is proportional to the turns ratio N. In one embodiment, the number N is a large number, such as 100. Therefore, if a load is 100 times bigger than the components of the active feedback network 540, the operating power is only affected by 1%. Hence, using the active feedback network 540, the feedback signal is converted into a current domain and then summed on the node G 646, such that the signal that is fed back to the amplifiers are essentially cancelled and very small. A more detailed implementation of the active feedback network 540 is provided in FIG. 7 and accompanying description below.

Figure 7:
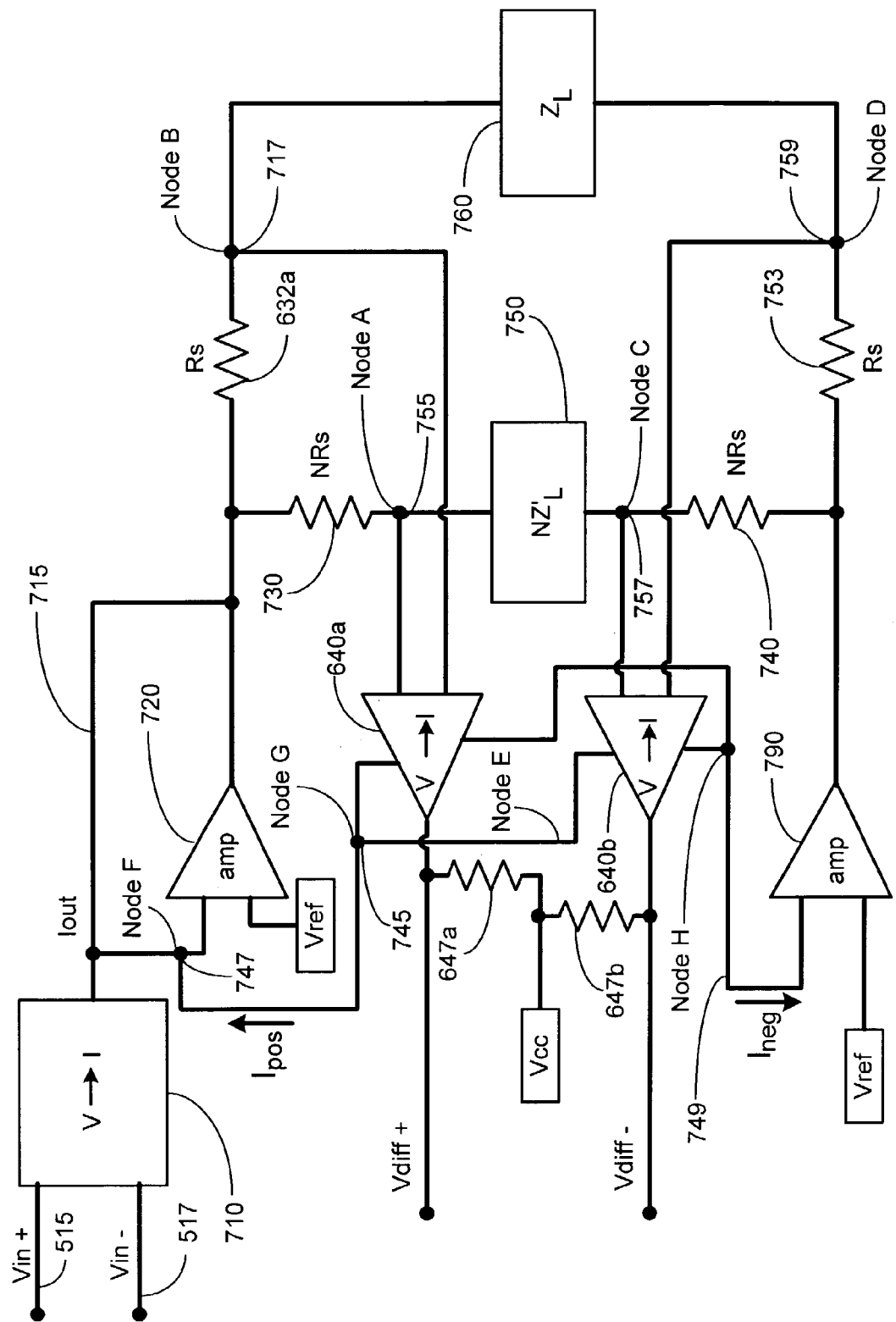
FIG. 7 illustrates a circuit diagram of the signal amplifier in the SLIC of FIG. 4, in accordance with one illustrative embodiment of the present invention.

Turning now to FIG. 7, one embodiment of a circuit implementing the active feedback network 540 in accordance with embodiments of the present invention is illustrated. A differential input voltage input_pos and input_neg 515, 517 are provided to a buffer 710. The buffer 710 may convert the received input voltage signal into a current signal. The output of the buffer on a line 715 is then fed to an amplifier 720 with a negative feedback configuration. An output terminal of the amplifier 720 is coupled with a terminal of the sense resistor 632a. The second terminal of the sense resistor 632a (node B) is then fed back to a voltage current amplifier located within the datasense 640, which may comprise amplifiers 640a and 640b). Furthermore, the amplifier 640a and 640b may comprise one of more amplifiers and/or buffers built in each one of them. The amplifier 640a then provides an output feedback, which may be the positive terminal of a differential output feedback signal. The sense resistor 632b provides a node D that is coupled to an input of a voltage-to-current amplifier 640a within the datasense 640. The outputs of the amplifiers 640a, 640a are then provided to the terminals 645a, 645b (shown, in FIG. 6). An output of the datasense signal 640a, which forms a node G (745), is summed with an output (node E) coming from the voltage-to-current signal amplifiers 640a and 640a. The summation of the signals on node G (745) is then fed back to the amplifier 720 as a current signal.

The active feedback network 540 provides a signal on a node A (755) and a node C (757) to the datasense voltage-to-current amplifiers 640a, 640b, respectively. A terminal of the resistor $R_S$ 632a is coupled with a terminal of a first resistor 730 ($N*R_S$) that is proportional to the sense resistor 632a by a factor of the turns ratio N of the transformer 635 (shown in FIG. 6). Similarly, a second resistor 740 ($N*R_S$) is also proportional to the resistor $R_S$ 632b by a factor of N. Additionally, the active feedback network 540 comprises an impedance device that provides an active impedance 750 ($NZ'_L$), which is proportional to the output impedance load $Z_L$ 760. The active impedance 750 is proportional to the impedance load 760 by a factor of N. The second terminal of the resistor 730 is coupled with an input terminal of the active impedance 750, forming the node A 755. Similarly, the second terminal of the resistor 740 is coupled with the second terminal of the impedance 750 forming node C 757. Node A 755 and node C 757 are fed into the datasense voltage-to-current amplifiers 640a, 640b. A first output of the datasense amplifiers 640a and 640b are summed on the node G 745 and fed back to the amplifier 720 via the node F 747, which is coupled to the line 715. In one embodiment, the voltage at nodes A and B, (755 and 717) are substantially the same. Additionally, the voltage at node C (757) and D (759) are also substantially the same.

The feedback that is sent to the amplifier 720 is a summation of the signal at node A 755 and the negative version of the signal on node B 717. In other words, the feedback signal, which is denoted by the signal $I_{pos}$ on the node G 745, is the signal on node A 755 minus the signal on node B 717. The feedback signal (node A 755 minus node B 717) is substantially small, i.e., very close to zero. Similarly a second output from the voltage-to-current amplifiers 640a, 640b, may be summed on a node H (coupled to a line 749) and fed-back to an amplifier 790, whose other input may be a reference voltage. The feedback signal, which is denoted by the signal $I_{neg}$ on the node H 749, is the signal on node C 757 minus the signal on node D 759. The feedback signal (node C 757 minus node D 759) is substantially small, i.e., very close to zero. This feedback level is achieved if the circuit illustrated in FIG. 7 is properly balanced.

One factor that leads to the proper balancing of the circuit in FIG. 7 is a function on how accurate is the proportional impedance 750 along with resistors 730 and 740. When the active feedback network 540 is set at correct proportional levels, and balance of the circuit is achieved, the feedback signal is substantially zero, thereby providing for smaller noise effects and the other benefits described above. In other words, the feedback provided by the circuit illustrated in FIG. 7 provides for a cancelled signal as a feedback signal for improved operation of the circuit.

By utilizing the small signals, the dynamic range of the amplifiers of FIG. 7 may be reduced, therefore, lower power amplifiers are implemented reducing power, and less noise is experienced. One of the advantages of manipulating the voltage signals and utilizing them as current signals by the circuit in FIG. 7 occurs because from a voltage point of view, the circuit "sees" a low gain and the impedance of the current source are very high. Therefore, the gain of the amplifier is near unity from the voltage feedback point of view. Hence, employing the electrical scheme described above, an amplifier will typically have a single pole roll-off. In order to keep the amplifier stable, since it is difficult to determine the actual gain, compensation for a unit gain is implemented; wide bandwidth may be achieved by putting different amounts of compensation in the amplifiers of the circuit in FIG. 7. Utilizing the current implementation, we are actually taking some of the current from the output of the circuit and summing it into the feedback signal, which provides for better matching and balance on the two sides of the impedance loop. Therefore, employing embodiments of the present invention, reduced dynamic range, power, and noise advantages are achieved, therefore, smaller circuits may be used, and savings in power and space realized.

Figure 8:
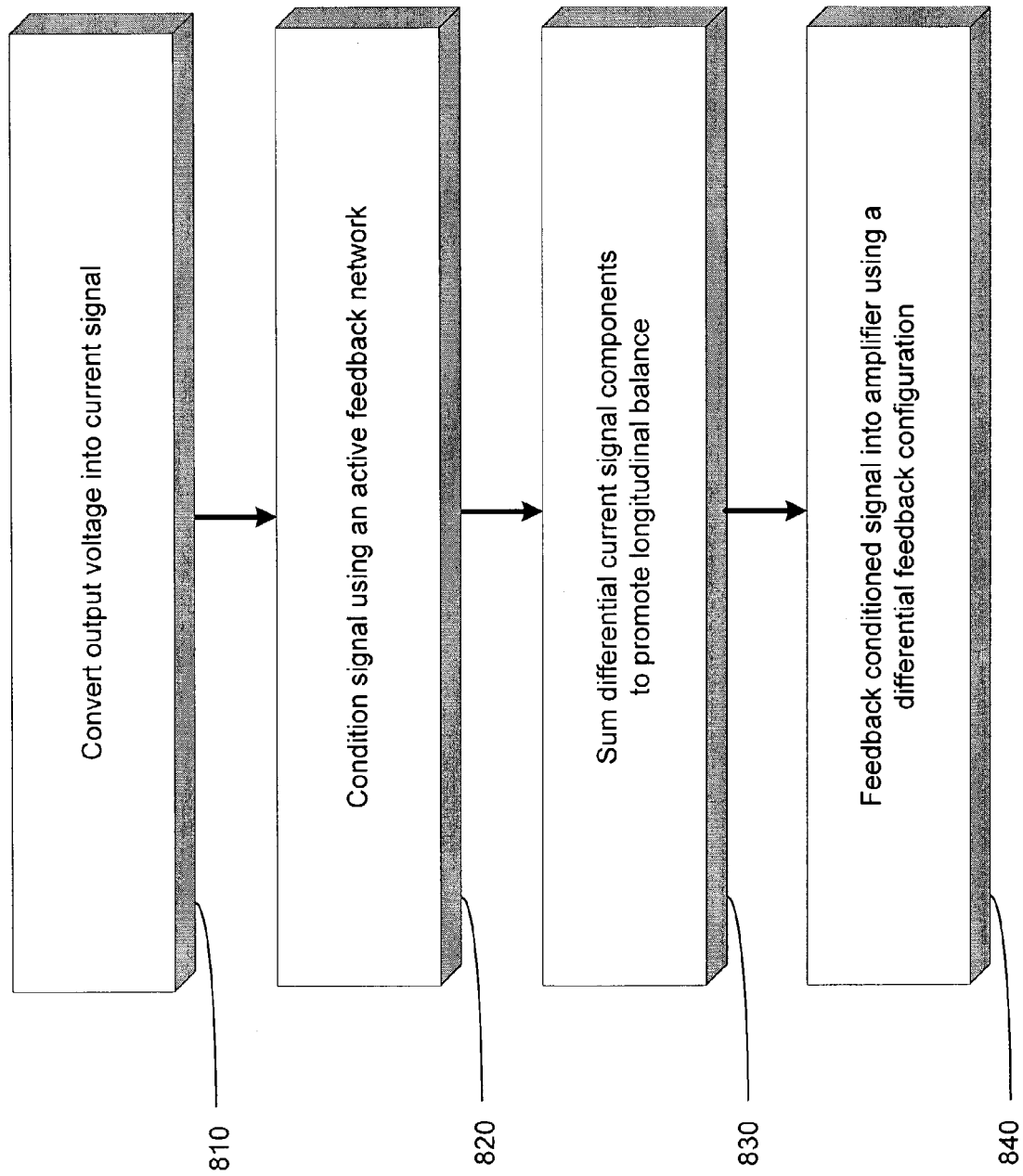

Turning now to FIG. 8, a flow chart illustration of embodiments of the present invention is illustrated. Upon receiving the signal, the signal amplifier 410 converts the output voltage into a current signal for manipulation of a current signal to reduce the dynamic range of the amplifiers being implemented. The signal amplifier 410 also conditions the received signal, which is in a differential feedback format, using an active feedback network 540 (block 820). The feedback signal may then be converted to a differential current signal for summation and cancellation (block 830). The active feedback network 540 provides for an active feedback synthesis to provide a summation of the feedback signal such that it is reduced substantially, and is fed back to an amplifier in the circuit (block 840). The conditioned differential feedback signal is then fed-back into the amplifier providing for less noise amplification and more efficient processing of the received signal. Utilizing embodiments of the present invention, a more robust, lower power, lower noise signal amplifier may be achieved. Therefore, a more efficient SLIC 310 may be used using embodiments described in the present invention. Therefore, lower line cards 210 may be realized.

Although for illustrative purposes, embodiments of the present invention have been discussed in the context of a line cards application, the amplifier arrangements taught by embodiments of the present invention is not limited to line card applications. The concepts taught by embodiments of the present invention may be utilized in a variety of electronic applications. The apparatuses 110, 120, 130 may be integrated in a system capable of transmitting and receiving signals having a voice band and/or a data band. The teachings of the present invention may be implemented in a line card 210 that supports POTS technology, ADSL technology, and/or similar technologies. The teachings of the present invention may also be implemented in various other electronics applications.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
receiving a signal; and
performing a current feedback of an output signal in an active feedback synthesis mode based upon said signal, performing said active current feedback comprising using an active feedback network for conditioning an output signal, converting said signal into a differential current signal, and summing at least two components of said differential current signal for performing a differential feedback.

2. The method of claim 1, wherein receiving said signal further comprises receiving a telecommunications signal.

3. The method of claim 1, further comprising:
providing a first feedback resistor pair that is proportional to a first output sense resistor;
providing a second feedback resistor pair in series with said first feedback resistor, said second feedback resistor being proportional to a second output sense resistor;
providing a feedback impedance in series with said first and second feedback resistor pairs, said feedback impedance being proportional to an output impedance; and
a signal summing node pair to sum said components of said conditioned differential output signal.

4. The method of claim 3, wherein performing a signal summation of at least two components of said conditioned output signal for feedback further comprises generating a canceled differential feedback signal by canceling a first signal from a first datasense amplifier output that is based upon a first component of said conditioned output signal with a second signal from a second datasense amplifier output that is based upon a second component of said conditioned differential output signal, and performing a differential feedback operation using said canceled feedback signal.

5. An apparatus, comprising:
means for receiving a signal; and
means for performing an current feedback of an output signal in an active feedback synthesis mode based upon said signal, performing said active current feedback synthesis comprising using an active feedback network for conditioning an output signal, converting said signal into a differential current signal, and summing at least two components of said differential current signal for performing a differential feedback.

6. An apparatus, comprising:
a first amplifier and a second amplifier to buffer a differential input signal to generate a differential output signal; and
an active impedance network to condition said differential output signal and sum at a first component and a second output signal of a first portion of said conditioned differential output signal, and to sum first and second components of a second portion of said conditioned differential output signal for generating a differential feedback signal for feedback into said first and second amplifiers.

7. The apparatus of claim 6, further comprising:
a first and a second sense resistor pairs for detecting a current level of said differential input signal;
a first datasense amplifier operatively coupled with a terminal of said first sense resistor and a first terminal of said active impedance network, said first datasense amplifier to generate said first portion of said conditioned output signal; and
a second datasense amplifier operatively coupled with a terminal of said second sense resistor and a second terminal of said active impedance network, said second datasense amplifier to generate said second portion of said conditioned output signal.

8. The apparatus of claim 6, wherein said signal summation of said first and said second components of said first and second portions provides a canceled differential feedback signal.

9. The apparatus of claim 6, wherein said active impedance network comprises a first resistor, a feedback impedance unit in series with said first resistor, and a second resistor in series with said feedback impedance unit, said first resistor, second resistor, and said feedback impedance unit each being proportional to an output impedance of said apparatus.

10. The apparatus of claim 9, wherein said output impedance is comprised of a transformer.

11. The apparatus of claim 10, wherein said first resistor, second resistor, and said feedback impedance unit each being proportional to a turns ratio of said transformer.

12. The apparatus of claim 11, wherein first resistor, second resistor, and said feedback impedance unit each being proportional to said output impedance by a factor of 100.

13. An apparatus, comprising:
a voltage-to-current signal converter to convert a differential input voltage signal;
a first buffer amplifier operatively coupled to said voltage to current signal converter, said first buffer amplifier to receive a component of a converted differential input signal on a first input terminal and produce a first buffered current signal;
a first sense resistor operatively coupled with said buffered amplifier;
a second buffer amplifier operatively coupled to said voltage-to-current signal converter, said second buffer amplifier to receive a component of said converted differential input signal on a second input terminal and produce a second buffered current signal;
a second sense resistor operatively coupled with said second buffer amplifier;
an active feedback impedance network operatively coupled with said first and second sense resistors;
a first datasense amplifier operatively coupled to said active feedback impedance network and to said first sense resistor, said first datasense amplifier to generate a first and second component of a differential feedback signal;
a second datasense amplifier operatively coupled to said active feedback impedance network and to said second sense resistor, said second datasense amplifier to generate a third and fourth component of said differential feedback signal;

a first summing node for summing said first and second components of said differential feedback signal to generate a first component of a summed differential feedback signal for feedback into said first buffer amplifier; and a second summing node for summing said third and fourth components of said differential feedback signal to generate a second component of said summed differential feedback signal for feedback into said second buffer amplifier.

14. The apparatus of claim 13, wherein said summed differential feedback signal is a canceled differential feedback signal.

15. The apparatus of claim 13, wherein said active impedance network comprises a first resistor, a feedback impedance unit in series with said first resistor, and a second resistor in series with said feedback impedance unit, said first resistor, second resistor, and said feedback impedance unit each being proportional to an output impedance of said apparatus.

16. The apparatus of claim 15, wherein said output impedance is comprised of a transformer.

17. The apparatus of claim 16, wherein said first resistor, second resistor, and said feedback impedance unit each being proportional to a turns ratio of said transformer.

18. The apparatus of claim 17, wherein said turns ratio of said transformer is 100.

19. A system, comprising:
a subscriber line; and
a line card electronically coupled with said subscriber line, said line card being adapted to:
receiving a signal; and
performing a current feedback of an output signal in an active feedback synthesis mode based upon said signal, performing said active current feedback comprising using an active feedback network for conditioning an output signal, converting said signal into a differential current signal, and summing at least two components of said differential current signal for performing a differential feedback.

20. The system of claim 19, wherein said line card comprising:
a first amplifier and a second amplifier to buffer a differential input signal to generate a differential output signal; and
an active impedance network to condition said differential output signal and sum at a first component and a second component of a first portion of said conditioned differential output signal, and to sum first and second components of a second portion of said conditioned differential output signal for generating a differential feedback signal for feedback into said first and second amplifiers.

21. The system of claim 20, said line card further comprising:
a first and a second sense resistor pairs for detecting a current level of said differential input signal;
a first datasense amplifier operatively coupled with a terminal of said first sense resistor and a first terminal of said active impedance network, said first datasense amplifier to generate said first portion of said conditioned output signal; and
a second datasense amplifier operatively coupled with a terminal of said second sense resistor and a second terminal of said active impedance network, said second datasense amplifier to generate said second portion of said conditioned output signal.

22. The system of claim 21, wherein said signal summation of said first and said second components of said first and second portions provides a canceled differential feedback signal.

23. The system of claim 22, wherein said active impedance network comprises a first resistor, a feedback impedance unit in series with said first resistor, and a second resistor in series with said feedback impedance unit, said first resistor, second resistor, and said feedback impedance unit each being proportional to an output impedance of said apparatus.

24. The system of claim 23, wherein said output impedance is comprised of a transformer.

25. The system of claim 24, wherein said first resistor, second resistor, and said feedback impedance unit each being proportional to a turns ratio of said transformer.

26. The system of claim 25, wherein said first resistor, second resistor, and said feedback impedance unit each being proportional to said output impedance by a factor of 100.

27. A method, comprising:
receiving a signal;
converting said signal into a differential current signal;
conditioning an output signal that is based upon said differential current signal, using a feedback network; and
summing at least two components of said output signal for performing a differential feedback.

28. The method of claim 27, wherein summing said at least two components of said conditioned output signal comprises generating a canceled differential feedback signal by canceling a first signal from a first datasense amplifier output that is based upon a first component of said conditioned output signal with a second signal from a second datasense amplifier output that is based upon a second component of said conditioned differential output signal, and performing a differential feedback operation using said canceled feedback signal.

* * * * *